S. T. GOODWIN.
SPRING SUSPENSION FOR VEHICLES.
APPLICATION FILED MAR. 9, 1918.

1,326,257.

Patented Dec. 30, 1919.

WITNESSES
Frederick Diehl.
B Joffe

INVENTOR
S. T. Goodwin
BY
ATTORNEYS

UNITED STATES PATENT OFFICE.

SAMUEL THOMAS GOODWIN, OF NEW YORK, N. Y.

SPRING SUSPENSION FOR VEHICLES.

1,326,257.  Specification of Letters Patent. Patented Dec. 30, 1919.

Application filed March 9, 1918. Serial No. 221,461.

*To all whom it may concern:*

Be it known that I, SAMUEL THOMAS GOODWIN, a citizen of the United States, and a resident of the city of New York, borough of Bronx, in the county of Bronx and State of New York, have invented a new and Improved Spring Suspension for Vehicles, of which the following is a full, clear, and exact description.

My invention relates to spring suspensions and has reference more particularly to the provision of a coil spring between a cantaliver spring and the bearing of the frame with the cantaliver spring.

An object of the invention is to provide a simple, inexpensive and efficient spring suspension.

I attain the above and other objects of my invention by the structure conventionally disclosed in the accompanying drawings, wherein similar characters of reference indicate corresponding parts in both views.

Figure 1:
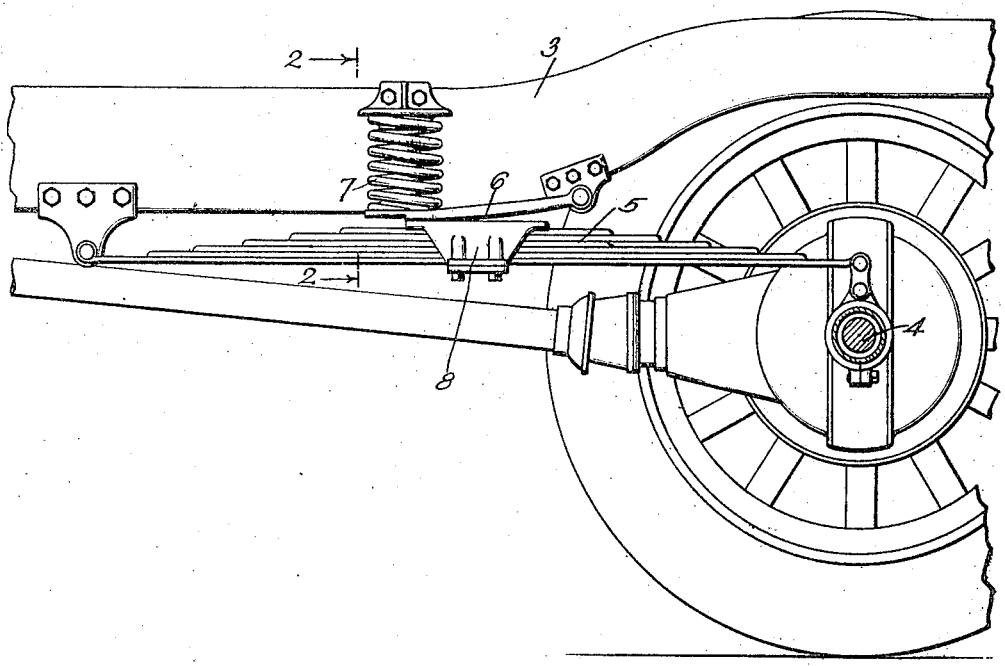
Figure 2:
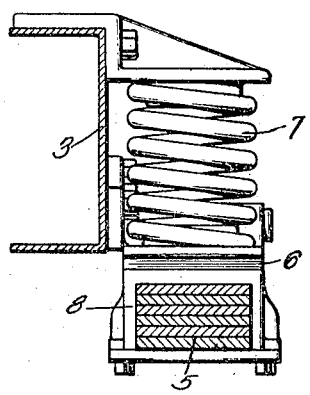

Figure 1 is a fragmentary longitudinal section of a vehicle provided with a spring suspension embodying my invention; and Fig. 2 is a vertical section on line 2—2, Fig. 1.

Referring to the drawings, 3 is the vehicle frame and 4 the running gear to which the frame is connected by a leaf spring 5, one end of which spring is connected to the running gear and the other to the frame. The vehicle frame 3 has an additional bearing on the leaf spring 5 between the ends of same. This bearing is formed by an arm 6 one end of which is pivotally connected to the frame 3 and the other end of which is engaged by a coil spring 7 which normally maintains said arm against the bracket 8 of the leaf spring 5. One of the bearing surfaces formed by the arm 6 and bracket 8 is preferably convex, so as to provide a slightly rolling surface. As shown, the arm 6 has the convex bearing surface; but it is self-evident that, if desired, the convex surface could be formed on the bracket.

The leaf spring 5 is a cantaliver spring and the coil spring is the additional yielding connection between the frame and the cantaliver spring. The coil spring 7 is primarily intended for taking up the light shocks which do not affect the cantaliver spring.

The arm 6, as will be noted, is a lever of the second class which has its effective leverage increased with the increase of resistance due to the fact that the increased shock causes the bearing points of the arm 6 and bracket 8 to approach the fulcrum of the arm.

While I have described the principle of operation, together with the device which I now consider to be the best embodiment thereof, I desire to have it understood that the device shown is merely illustrative and that such changes may be made as are within the scope of the appended claims.

I claim:

1. In combination, a vehicle frame, a running gear, a leaf spring having one end connected to the frame and the other to the running gear, an arm pivotally connected to the frame and bearing on said leaf spring, and a spring having one end engaging the free end of said arm and its other end engaging the frame.

2. In combination, a vehicle frame, a running gear, a leaf spring having one end connected to the frame and the other to the running gear, an arm pivotally connected to the frame, and a coil spring having one end engaging the free end of the arm and its other end engaging the frame to maintain said lever against the leaf spring between the ends of said leaf spring.

3. In combination, a vehicle frame, a running gear, a leaf spring having one end connected to the frame and the other to the running gear, a second-class lever forming an additional bearing between the leaf spring and the frame, and a spring connection between the second-class lever and the frame.

4. In combination, a vehicle frame, a running gear, a leaf spring having one end connected to the frame and the other to the running gear, an arm pivotally connected to the frame and bearing on said leaf spring, said arm and leaf spring having a convex bearing surface, and a yielding member interposed between the frame and the free end of said arm.

5. In combination, a vehicle frame, a running gear, a leaf spring having one end connected to the frame and the other to the running gear, a lever fulcrumed on the frame and bearing on the leaf spring between the ends thereof, and a coil spring interposed between the frame and the free end of the lever, said lever having a convex bearing surface so that the bearing between the lever and spring is adapted to approach the fulcrum when said running gear is forced toward the frame.

SAMUEL THOMAS GOODWIN.